United States Patent
Pindl et al.

(10) Patent No.: US 10,694,584 B2
(45) Date of Patent: Jun. 23, 2020

(54) INFRARED EMITTER ARRANGEMENT AND METHOD FOR PRODUCING AN INFRARED EMITTER ARRANGEMENT

(71) Applicant: Infineon Technologies AG, Neubiberg (DE)

(72) Inventors: Stephan Pindl, Ergoldsbach (DE); Daniel Porwol, Straubing (DE); Johann Strasser, Schierling (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/818,835

(22) Filed: Nov. 21, 2017

(65) Prior Publication Data
US 2018/0146512 A1 May 24, 2018

(30) Foreign Application Priority Data
Nov. 22, 2016 (DE) .................. 10 2016 122 479

(51) Int. Cl.
*G01N 21/17* (2006.01)
*H05B 3/00* (2006.01)
*G02B 5/20* (2006.01)
*G02B 5/26* (2006.01)

(52) U.S. Cl.
CPC .......... *H05B 3/009* (2013.01); *G01N 21/1702* (2013.01); *G02B 5/208* (2013.01); *G02B 5/26* (2013.01); *G01N 2021/1704* (2013.01); *H05B 2203/017* (2013.01)

(58) Field of Classification Search
CPC .............................. G01N 21/3504; G01J 5/045
See application file for complete search history.

(56) References Cited

U.S. PATENT DOCUMENTS

| 5,869,749 A | 2/1999 | Bonne et al. | |
|---|---|---|---|
| 2007/0034978 A1* | 2/2007 | Pralle | B82Y 20/00 257/432 |
| 2012/0267532 A1* | 10/2012 | Udrea | H05B 3/267 250/338.5 |

(Continued)

FOREIGN PATENT DOCUMENTS

| DE | 69820308 T2 | 11/2004 |
|---|---|---|
| DE | 102004032176 A1 | 1/2006 |
| WO | 9849539 A1 | 11/1998 |

OTHER PUBLICATIONS

German Search Report based on application No. 10 2016 122 479.0 (7 pages) dated Jul. 6, 2017 (Reference Purpose Only).

*Primary Examiner* — Kenneth J Malkowski
(74) *Attorney, Agent, or Firm* — Viering, Jentschura & Partner MBB

(57) ABSTRACT

A method for producing an infrared emitter arrangement is provided. The method includes providing a carrier. The carrier includes at least one infrared emitter structure at a first side of the carrier and at least one cutout at a second side of the carrier, said second side being situated opposite the first side of the carrier, wherein the at least one cutout extends from the second side of the carrier in the direction of the at least one infrared emitter structure. The method further includes securing an infrared filter layer structure at the second side of the carrier in such a way that the at least one cutout separates the at least one infrared emitter structure from the infrared filter layer structure.

24 Claims, 11 Drawing Sheets

(56) References Cited

U.S. PATENT DOCUMENTS

2015/0101395 A1* 4/2015 Dehe .................. G01N 29/2418
73/24.02
2015/0102372 A1* 4/2015 Dehe ....................... H01L 33/44
257/98
2015/0316472 A1* 11/2015 Yon ......................... G01J 5/041
356/437

* cited by examiner

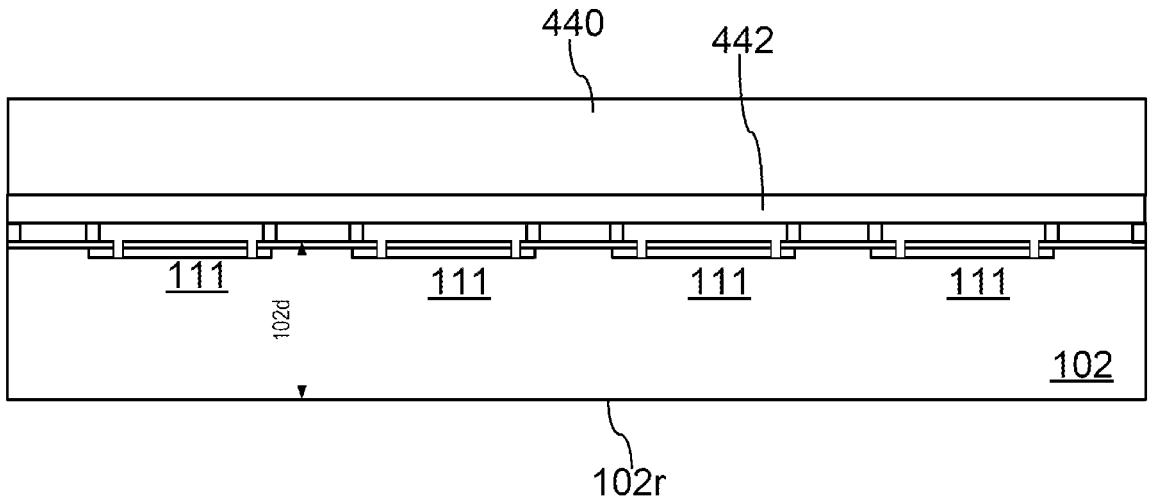
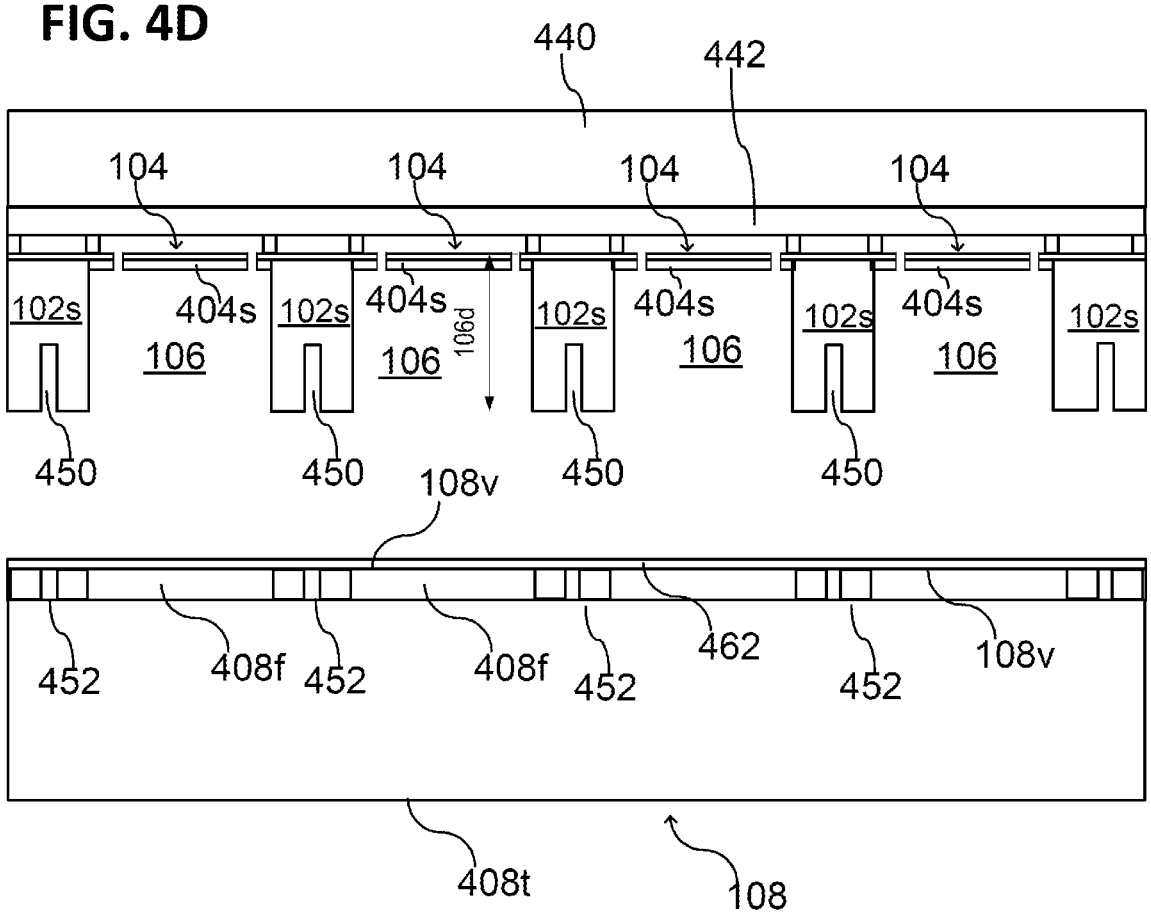

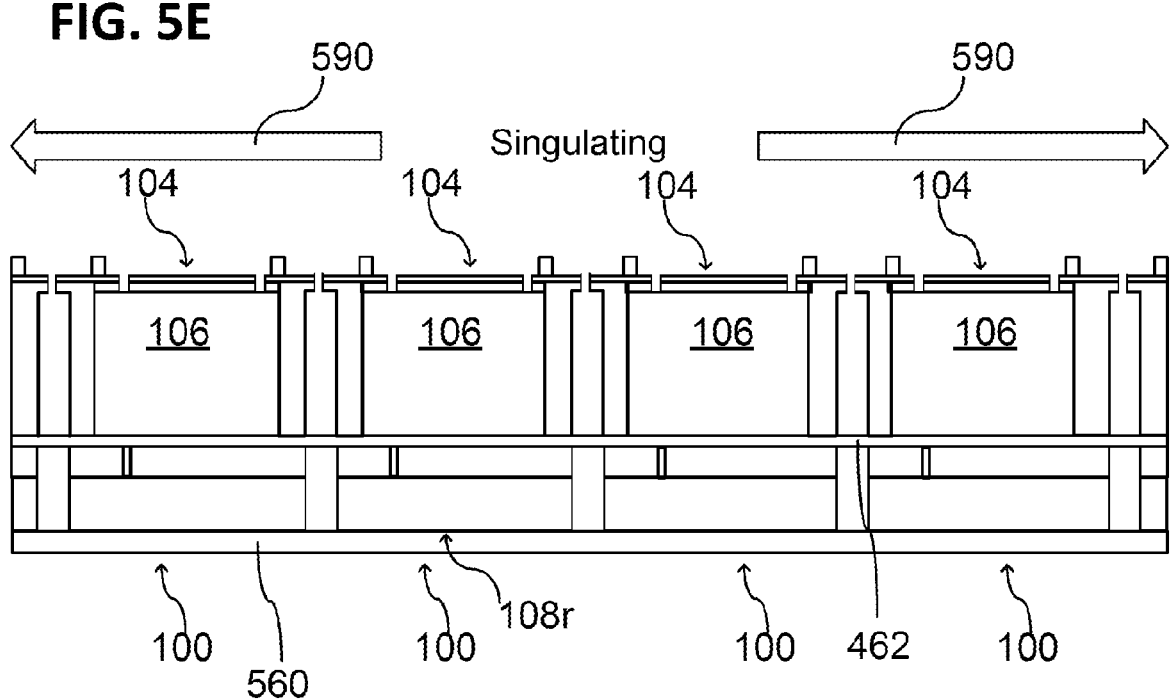
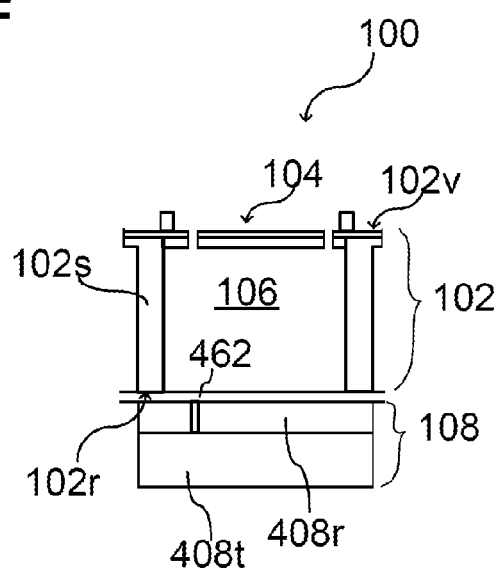

Providing a carrier, wherein the carrier comprises at least one infrared emitter structure at a first side of the carrier and at least one cutout at a second side of the carrier, said second side being situated opposite the first side of the carrier, wherein the at least one cutout extends from the second side of the carrier in the direction of the at least one infrared emitter structure — 610

Securing an infrared filter layer structure at the second side of the carrier in such a way that the at least one cutout separates the at least one infrared emitter structure from the infrared filter layer structure — 620

FIG. 7

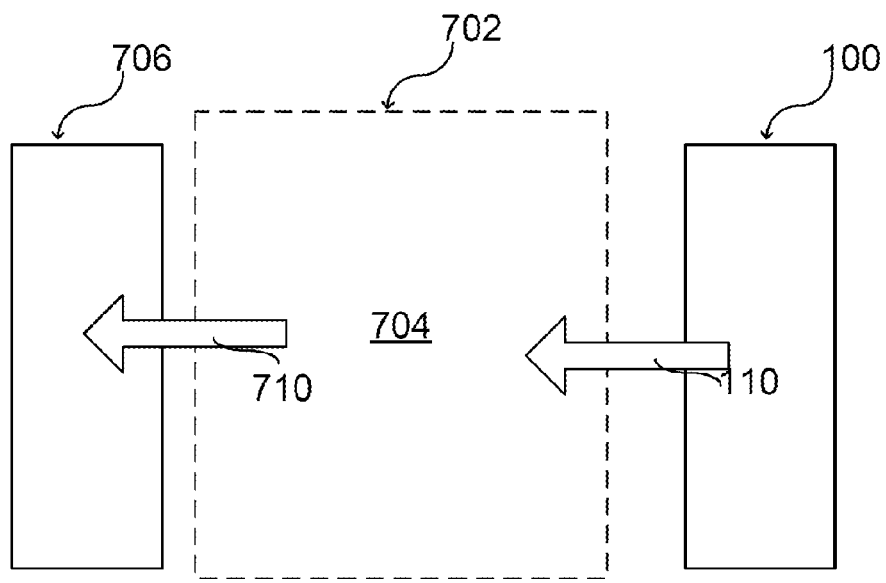

INFRARED EMITTER ARRANGEMENT AND METHOD FOR PRODUCING AN INFRARED EMITTER ARRANGEMENT

CROSS-REFERENCE TO RELATED APPLICATION

This application claims priority to German Patent Application Serial No. 10 2016 122 479.0, which was filed Nov. 22, 2016, and is incorporated herein by reference in its entirety.

TECHNICAL FIELD

Various embodiments relate to an infrared emitter arrangement, a method for producing an infrared emitter arrangement, and a gas sensor.

BACKGROUND

For integrated circuits such as microelectromechanical systems (MEMS), for example, the size and height of the structures, for example, may be of importance. Chips can be implemented for example in mobile devices, e.g. in a smartphone, a tablet, a laptop, or the like. Furthermore, the procedure for designing integrated circuits should also take account of economic factors, for example, such as the costs and/or the suitability for mass production, for example. On account of complex structures conventionally used, MEMS components may be very expensive to produce or not producible at all with a sufficiently high yield in mass production.

For the targeted generation of infrared (IR) radiation, e.g. as an emitter in a remote control, in a smartphone, etc., it is possible to use an infrared LED, for example. The infrared LED can conventionally be designed in such a way that it emits an infrared radiation having a wavelength of 840 nm to 950 nm. In contrast to infrared LEDs, it is also possible to use thermal radiators for emitting infrared radiation, wherein said thermal radiators can be operated continuously or in a pulsed manner. Thermal radiators emit a continuous wavelength spectrum. In the ideal case, the wavelength-dependent intensity of the thermally emitted radiation (referred to as black-body radiation) for different temperatures can be designed by means of Planck's radiation law. Bodies at a temperature of less than a few thousand kelvins substantially emit electromagnetic radiation in the infrared wavelength range, e.g. in the wavelength range of approximately 1 mm to approximately 780 nm.

In order to emit a defined wavelength range by means of a thermal emitter, it is possible to use for example an infrared filter, e.g. a bandpass filter. By means of the infrared filter, a predefined wavelength range can be selected from the continuous thermally generated radiation spectrum.

SUMMARY

A method for producing an infrared emitter arrangement is provided. The method includes providing a carrier. The carrier includes at least one infrared emitter structure at a first side of the carrier and at least one cutout at a second side of the carrier, said second side being situated opposite the first side of the carrier, wherein the at least one cutout extends from the second side of the carrier in the direction of the at least one infrared emitter structure. The method further includes securing an infrared filter layer structure at the second side of the carrier in such a way that the at least one cutout separates the at least one infrared emitter structure from the infrared filter layer structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 4A to 4F respectively show a schematic cross-sectional view of a plurality of jointly processed infrared emitter arrangements at different points in time of a production method, in accordance with various embodiments;

FIGS. 5A to 5E respectively show a schematic cross-sectional view of a plurality of jointly processed infrared emitter arrangements at different points in time of a production method, in accordance with various embodiments;

FIG. 5F shows a schematic cross-sectional view of a singulated infrared emitter arrangement, in accordance with various embodiments;

FIG. 6 shows a schematic flow diagram of a method for producing an infrared emitter arrangement, in accordance with various embodiments; and FIG. 7 shows a schematic view of a gas sensor including an infrared emitter arrangement, in accordance with various embodiments.

DESCRIPTION

Figure 1A:
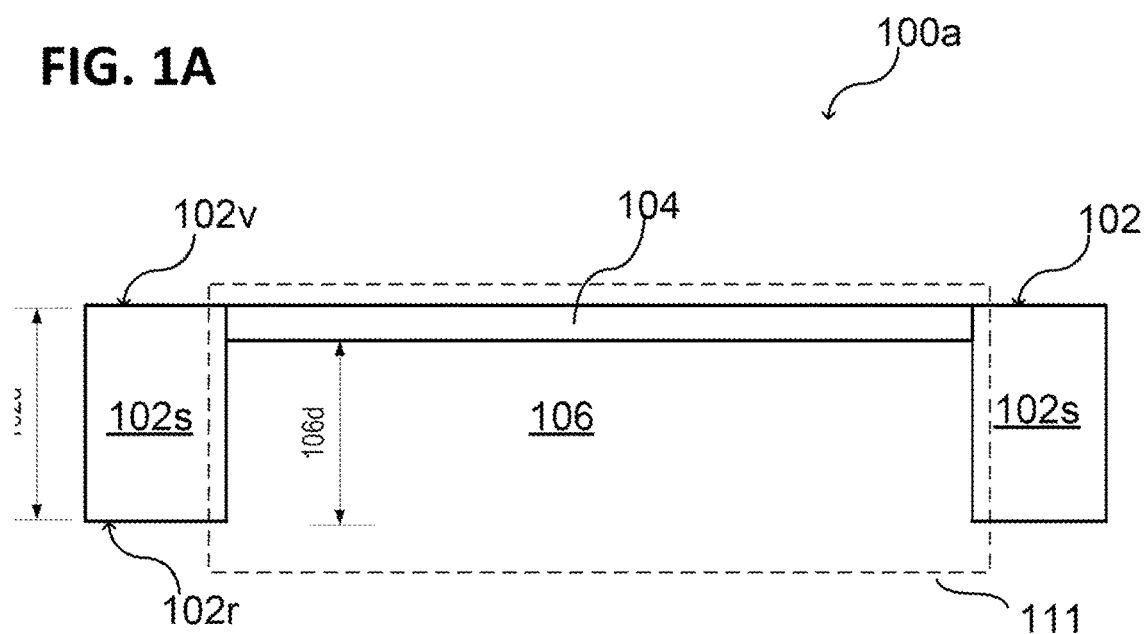
FIGS. 1A and 1B respectively show a schematic cross-sectional view of an infrared emitter arrangement at different points in time of a production method, in accordance with various embodiments.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components parts of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

In various embodiments, an infrared emitter arrangement or an IR emitter/filter component is provided, e.g. in the form of a chip package (also referred to as chip housing). At least one further chip can be arranged in the chip housing, or in other words the chip housing can be a multi-chip package. The infrared emitter arrangement or the IR emitter/filter component can for example also be referred to as a MEMS chip for example including: a thin heating membrane, a cutout in the substrate for freeing the heating membrane, and optionally a ventilation hole for ventilating the cutout. In this case, the cutout is provided between the heating membrane and an IR filter. The substrate can be a silicon substrate. In this case, the heating membrane can be formed from the silicon of the silicon substrate. As an alternative thereto, the heating membrane can be formed on the silicon substrate; by way of example, a structured metal layer can be applied on the silicon substrate.

In accordance with various embodiments, the IR filter can be provided as a Bragg reflector. In this case, the IR filter can be formed on and/or in a further substrate, e.g. a further silicon substrate. In accordance with various embodiments, the Bragg reflector may include a plurality of mutually different layers, e.g. a plurality of silicon layers (e.g. polycrystalline silicon layers) and a plurality of silicon oxide layers. The mutually different layers of the Bragg reflector can be configured in the form of a layer stack having an alternating layer sequence. The Bragg reflector, i.e. for example the layer stack, can be formed on and/or in the further substrate, e.g. a further silicon substrate. The further silicon substrate including the IR filter can be connected to the silicon substrate including the heating membrane in such a way that the cutout is arranged between the heating membrane and the IR filter.

In accordance with various embodiments, it is possible herein to use a substrate (e.g. a part of a silicon wafer) as a spacer between the infrared (IR) emitter structure and the infrared (IR) filter. Conventionally used polymers for mounting an IR filter may be difficult to produce or entail other problems.

In accordance with various embodiments, two substrates (e.g. respectively a silicon substrate or glass substrate) can be used, wherein an IR emitter is provided on the first substrate and wherein an IR filter is provided on the second substrate.

In accordance with various embodiments, the infrared emitter arrangement described herein may include one IR emitter/filter component or a plurality of IR emitter/filter components. If the infrared emitter arrangement includes a plurality of IR emitter/filter components, the latter can subsequently be singulated.

Figure 1B:
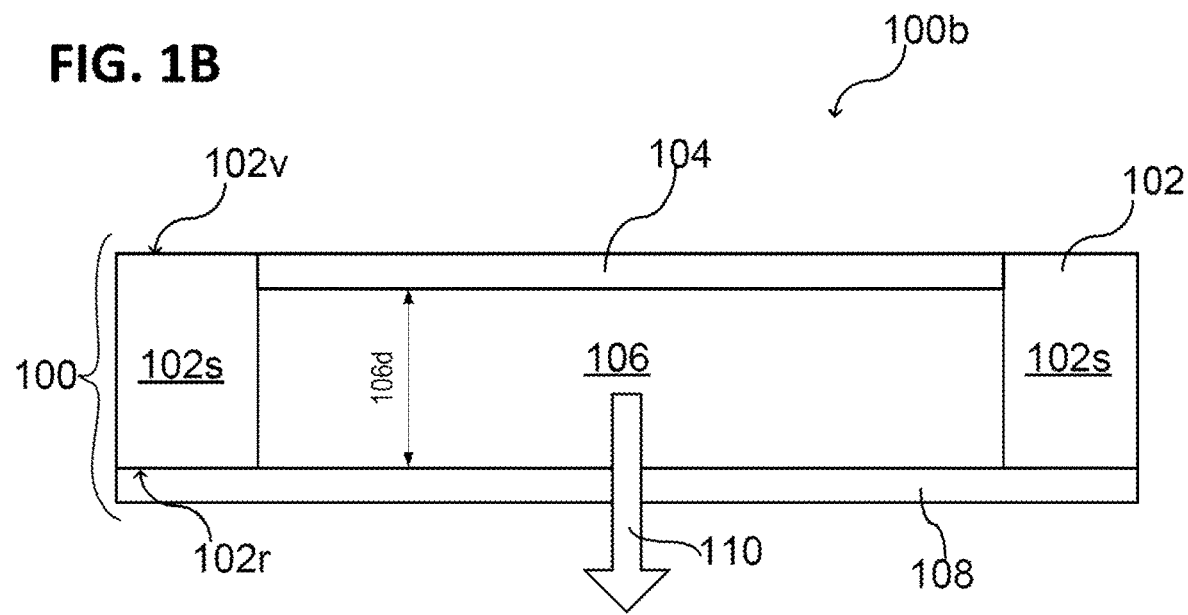

FIG. 1A and FIG. 1B respectively show a schematic cross-sectional view of an infrared emitter arrangement 100 at different points in time 100a, 100b of a production method (cf. method 600 in FIG. 6), in accordance with various embodiments.

In accordance with various embodiments, the method for producing the infrared emitter arrangement 100 may include, in step 100a (see FIG. 1A), providing a carrier 102. The carrier 102 may include for example a first side 102v and a second side 102r. The first side 102v of the carrier 102 and the second side 102r of the carrier 102 are situated opposite one another. The carrier 102 can be plate-shaped, for example; e.g. the carrier 102 can be a wafer or some other plate-shaped substrate. The carrier 102 can be for example a silicon wafer or a plate-shaped glass substrate. Alternatively, the carrier 102 can also include one or a plurality of different materials or consist of a different material.

At least one infrared emitter structure 104, e.g. one infrared emitter structure 104, can be arranged at the first side 102v of the carrier 102. In this case, the infrared emitter structure 104 can be an integral constituent of the carrier 102. By way of example, the material of the carrier 102 (e.g. silicon, e.g. doped silicon, e.g. polycrystalline silicon, e.g. polycrystalline doped silicon) can be structured as an infrared emitter structure 104 (e.g. as a heating membrane). Furthermore, the infrared emitter structure 104, e.g. one infrared emitter structure 104, can be formed as an additional layer 104 (e.g. as a metal layer, e.g. as a structured metal layer, e.g. as a polycrystalline silicon layer, e.g. as a polycrystalline doped silicon layer) on and/or in the carrier 102.

Furthermore, the carrier 102 may include at least one cutout 106. The at least one cutout 106 can extend from the second side 102r of the carrier in the direction of the at least one infrared emitter structure 104. The at least one cutout 106 can at least partly expose the infrared emitter structure 104. The infrared emitter structure 104 may include an etch stop layer (e.g. an oxide layer or the like) at the side directed toward the cutout 106, such that for example the carrier material of the carrier 102 can be removed in a defined manner by means of an etching method (e.g. by means of reactive ion etching or wet-chemical etching) in order to form the cutout 106 in the carrier 102.

In accordance with various embodiments, the at least one cutout 106 can define a supporting region 102s (in other words a supporting structure) of the carrier 102. Illustratively, the remaining material of the carrier 102, which material laterally surrounds the at least one cutout 106, forms the supporting region 102s. The supporting region 102s of the carrier 102 defines for example a thickness 102d of the carrier 102 and also a depth 106d of the at least one cutout 106. In accordance with various embodiments, the carrier 102 can have a thickness 102d in a range of approximately 30 µm to approximately 300 µm, e.g. a thickness 102d in a range of approximately 50 µm to approximately 250 µm. Depending on the thickness of the infrared emitter structure 104 (e.g. in a range of approximately 5 µm to approximately 20 µm), the at least one cutout 106 can have a depth 106d in a range of approximately 10 µm to approximately 295 µm, e.g. a depth 106d in a range of approximately 30 µm to approximately 245 µm.

Furthermore, the method for producing the infrared emitter arrangement 100 may include, in step 100b (see FIG. 1B), securing an infrared filter layer structure 108 at the second side 102r of the carrier 102. In this case, securing the infrared filter layer structure 108 can be carried out in such a way that the at least one cutout 106 separates the at least one infrared emitter structure 104 from the infrared filter layer structure 108. Illustratively, the at least one cutout 106 defines a distance 106d (e.g. corresponding to the depth of the cutout 106) between the infrared emitter structure 104 and the infrared filter layer structure 108.

As is illustrated in FIG. 1B, the infrared emitter arrangement 100 can for example be correspondingly configured to emit infrared radiation 110, wherein the latter is partly filtered by means of the infrared filter layer structure 108, such that for example a desired infrared radiation spectrum can be provided. The infrared radiation is generated for example on the basis of thermal emission with a continuous emission spectrum by means of the infrared emitter structure 104, e.g. by means of a heating structure. The latter can be brought in a pulsed manner to a temperature in a range of approximately 500° C. to 1300° C., e.g. to a temperature in a range of approximately 700° C. to 900° C. The pulse duration here can be in the milliseconds range, e.g. in a range of approximately 1 ms to 900 ms. As infrared emitter structure 104 it is possible to use a correspondingly electrically contacted heating resistance structure, for example, which can be heated by means of an electrical current pulse. A driver circuit for operating the infrared emitter structure 104 can be integrated for example into a different region of the carrier 102 (not illustrated). As an alternative thereto, a driver circuit for operating the infrared emitter structure 104 can be arranged on a further chip, which is arranged with the infrared emitter arrangement 100 in a common chip package.

As is illustrated in FIG. 1A, the carrier 102 may include a component region 111, in which the at least one cutout 106 is formed. The component region 111 can substantially be defined by the infrared emitter structure 104 or the infrared emitter structure 104 is arranged in the component region 111 of the carrier 102.

The infrared emitter arrangement 100 described herein can be processed for example at the wafer level, that is to say that the carrier 102 can for example be a first wafer and include a multiplicity of infrared emitter structures 104. Furthermore, the infrared filter layer structure 108 can be provided by means of a second wafer.

In accordance with various embodiments, a first wafer, which includes or bears one or a plurality of infrared emitter structures 104, and which includes one or a plurality of cutouts 106, can be connected to a second wafer, wherein the second wafer includes or bears one or a plurality of infrared filter structures, as described herein, for providing the infrared emitter arrangement 100.

Consequently, a plurality of infrared emitter arrangements 100 can be simultaneously produced alongside one another at the wafer level, wherein the plurality of infrared emitter arrangements 100 are finally singulated. The singulated infrared emitter arrangements 100 (illustratively individual infrared emitter/filter chips or Infrared emitter/filter dies) can subsequently be mounted on a printed circuit board, e.g. by means of a so-called pick and place process. Furthermore, the singulated infrared emitter arrangements 100 can be housed (in other words packaged, e.g. by means of so-called chip packaging) individually or with at least one further chip.

Figure 2A:
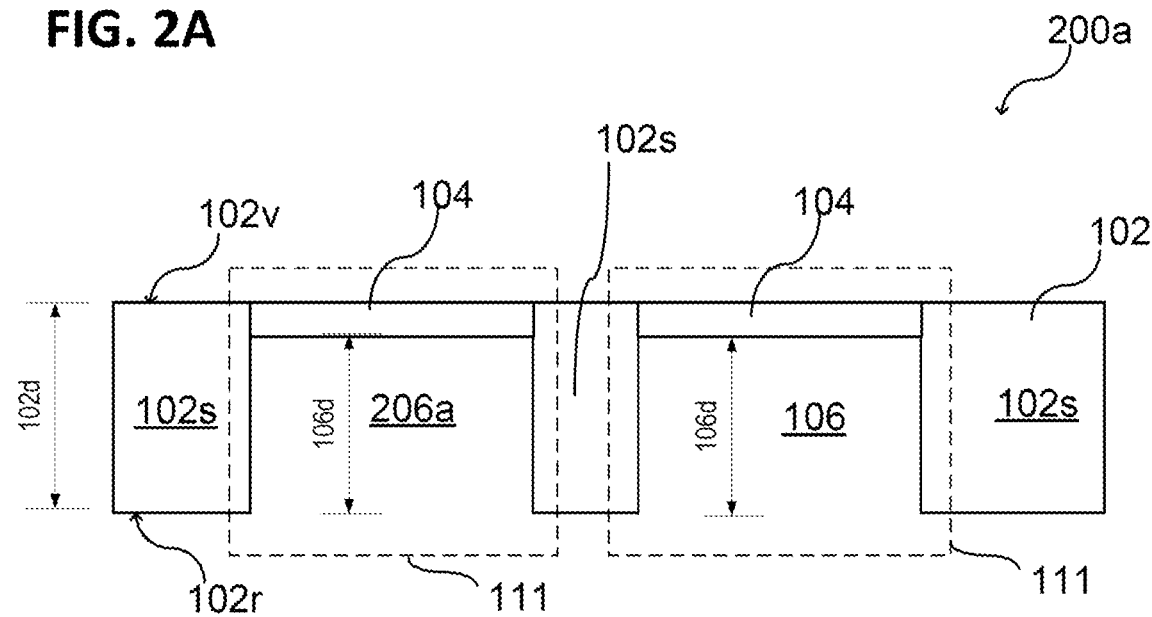
FIGS. 2A to 2C respectively show a schematic cross-sectional view of a plurality of jointly processed infrared emitter arrangements at different points in time of a production method, in accordance with various embodiments.
Figure 2B:
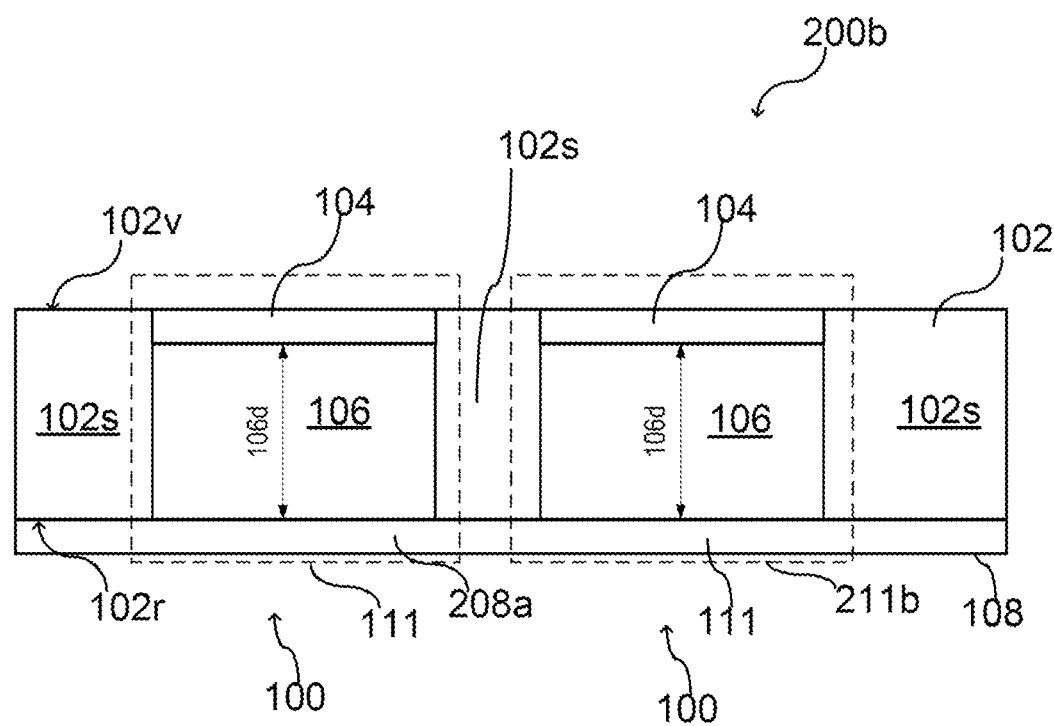

FIG. 2A and FIG. 2B respectively show a schematic cross-sectional view of a plurality of infrared emitter arrangements 100, which are processed jointly, at different points in time 200a, 200b of a production method (cf. method 600 in FIG. 6), in accordance with various embodiments. In a manner analogous to that described above with regard to FIG. 1A and FIG. 1B, the carrier 102 may include a plurality of component regions 111 for forming a plurality of infrared emitter arrangements 100. Illustratively, the carrier 102 includes a plurality of infrared emitter structures 104 (e.g. a plurality of heating structures) and a plurality of cutouts 106. Here in each case at least one infrared emitter structure 104 and at least one cutout 106 can be provided in each of the component regions 111.

Each of the cutouts 106 can be laterally surrounded by carrier material of the carrier 102. Illustratively, the plurality of cutouts 106 can define a supporting region 102s of the carrier 102. The supporting region 102s of the carrier 102 defines for example a thickness 102d of the carrier 102 and a depth 106d of the plurality of cutouts 106, as described above. In accordance with various embodiments, a supporting region 102s of the carrier 102 can be provided in each case between two mutually adjacent cutouts 106.

After securing the infrared filter layer structure 108 at the carrier 102, as is illustrated in FIG. 2B, the respective cutouts 106 separate the infrared emitter structures 104 from the infrared filter layer structure 108.

In accordance with various embodiments, the infrared filter layer structure 108 is configured in such a way that an infrared filter structure 208a, 208b is arranged at least in each of the component regions 111 or that at least one part of the infrared filter layer structure 108 is arranged in each of the component regions 111.

In accordance with various embodiments, a respective infrared emitter arrangement 100 is formed in each component region 111. Each infrared emitter arrangement 100 includes an infrared emitter structure 104, an infrared filter structure 208a, 208b, and a cutout 106 between the infrared emitter structure 104 and the infrared filter layer structure 108.

Figure 2C:
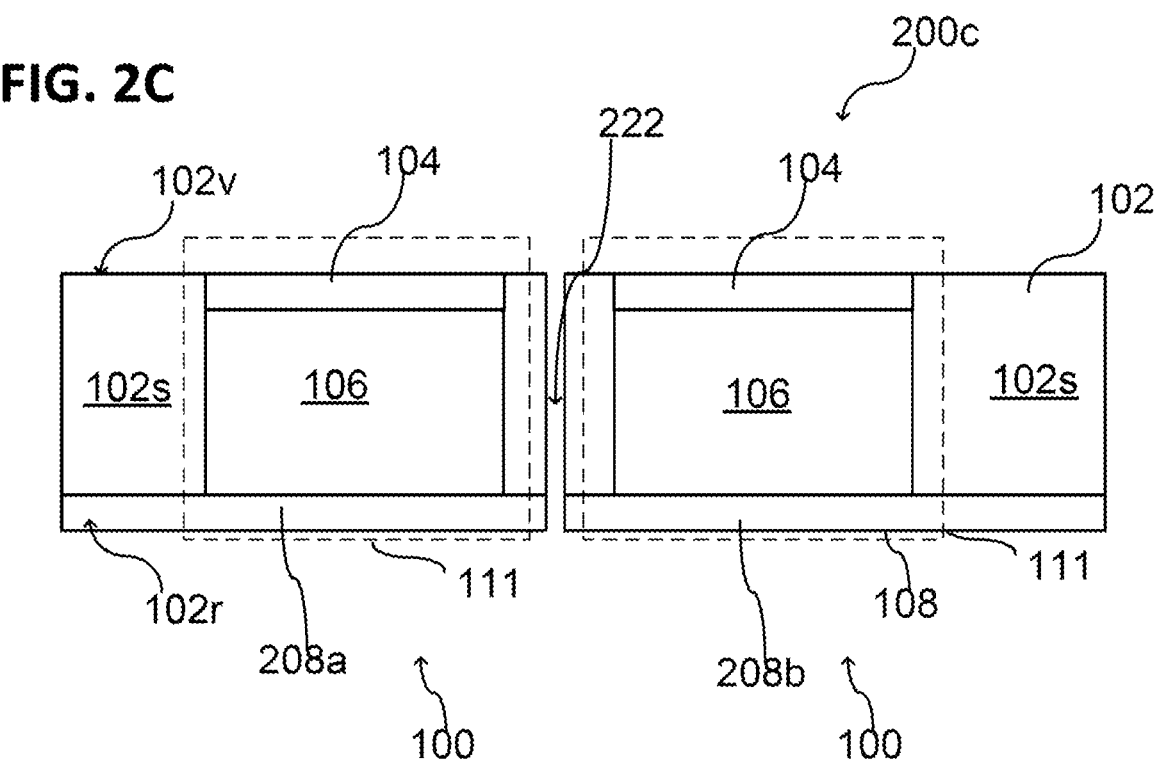

As is illustrated in FIG. 2C in a schematic cross-sectional view, the infrared emitter arrangements 100 can be singulated in a manner corresponding to the component regions 111. To that end, the carrier 102 and the infrared filter layer structure 108 can be separated in a separating region 222 between in each case two adjacent component regions 111, e.g. by means of sawing, plasma etching or the like.

Illustratively, after securing the infrared filter layer structure 108 at the carrier 102, a separating structure (e.g. a trench or a perforation) can be formed through the infrared filter layer structure 108 and the respective supporting regions 102s of the carrier 102 for the purpose of singulating the plurality of component regions 111. Even after singulating, each of the cutouts 106 is still surrounded by carrier material, or in other words even after singulating the plurality of component regions 111, the respective infrared emitter structure 104 remains connected to the associated infrared filter layer structure 108 (or at least one corresponding divided-off infrared filter structure 208a, 208b of the infrared filter layer structure 108).

Figure 3:
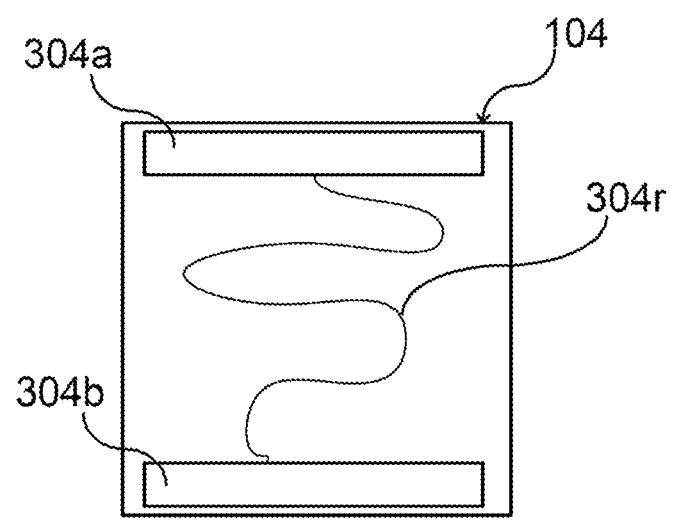
FIG. 3 a schematic plan view of a heating structure as an infrared emitter structure, in accordance with various embodiments.

FIG. 3 illustrates an infrared emitter structure 104 in a schematic plan view. The infrared emitter structure 104 can be configured for example as a heating structure. The heating structure may include for example a heating structure element 304r, e.g. an electrical heating resistor. The heating structure element 304r can be electrically contacted by means of two electrical contacts 304a, 304b. The heating structure element 304r can be formed for example by means of a structured metal layer and/or structured polysilicon layer (or the like), The heating structure element can be for example a membrane, e.g. a silicon membrane, which is contacted by means of two electrical contacts for the purpose of carrying an electric current through the membrane.

In accordance with various embodiments, the heating structure element 304r can be formed in a meandering shape, zig zag shape, spiral line shape, wavy line shape, or the like. This can enable the infrared emitter structure 104 to be heated homogeneously for example. Illustratively, the infrared emitter structure 104 can be a thin (at least partly self-supporting) silicon membrane that is provided on, at and/or in the carrier 102 (e.g. a silicon wafer) by means of the cutout 104.

FIG. 4A to FIG. 4F respectively show a schematic cross-sectional view of a plurality of infrared emitter arrangements 100 processed at the wafer level at different points in time

400*a*, 400*b*, 400*c*, 400*d*, 400*e*, 400*f* of a production method (cf. method 600 in FIG. 6), in accordance with various embodiments.

Figure 4A:
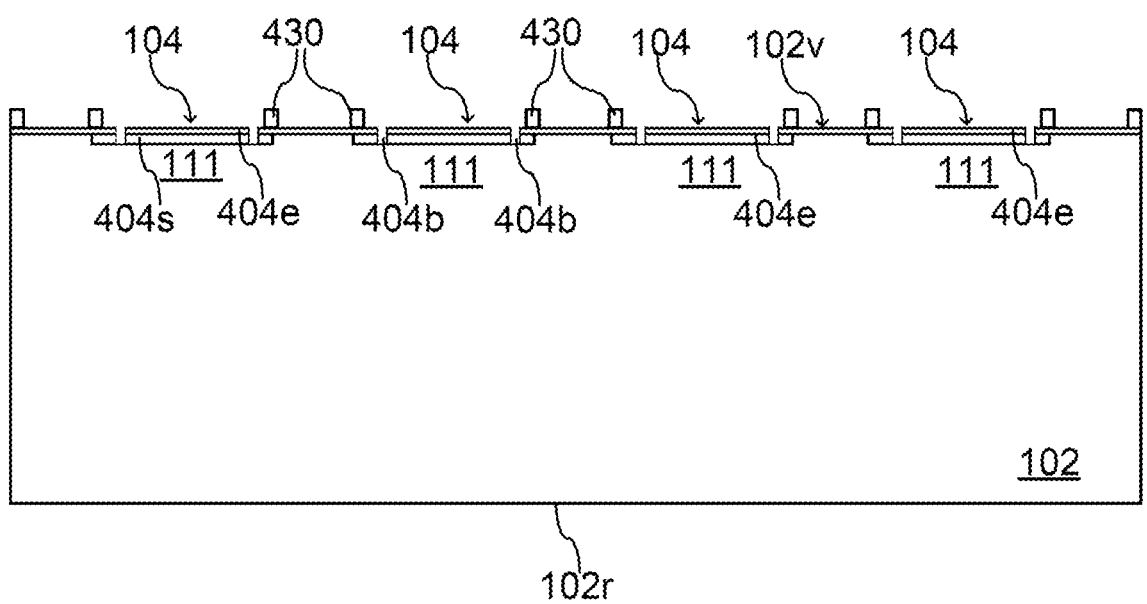

FIG. 4A illustrates a preprocessed carrier 102 (e.g. a silicon wafer or a glass wafer). The preprocessed carrier 102 includes an infrared emitter layer 404*e*, in accordance with various embodiments. The infrared emitter layer 404*e* forms the infrared emitter structure 104 or a part of the infrared emitter structure 104 in the respective component regions 111. Furthermore, the carrier 102 may include a spacer structure 430 or a spacer structure 430 can be secured at the carrier 102, e.g. on the front side 102*v* of the carrier 102. The spacer structure 430 can be for example a structured layer, e.g. including or consisting of a polymer, e.g. polyimide.

Furthermore, a respective ventilation hole 404*b* can be provided, e.g. optionally, in the carrier 102, e.g. at least one in each component region 111. The respective ventilation hole 404*b* can be provided in such a way that the cutouts 106 subsequently formed can be ventilated. The ventilation hole 404*b* can be provided at any suitable position.

A further layer 404*s*, e.g. an oxide layer, as etch stop layer can be formed below the infrared emitter layer 404*e*. The etch stop layer can be formed for example only in the component regions 111.

Figure 4B:
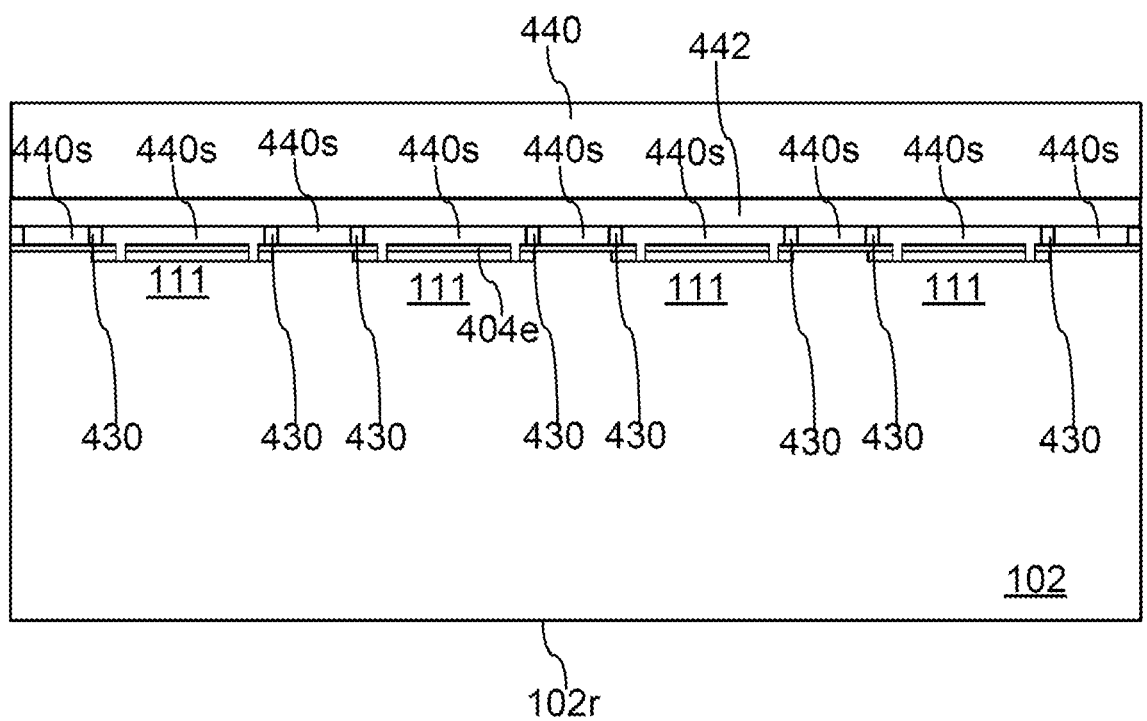

As is illustrated in a schematic cross-sectional view in FIG. 4B, the preprocessed carrier 102 illustrated in FIG. 4A can be secured at an auxiliary carrier 440. The auxiliary carrier 440 can be for example a silicon wafer or a glass wafer. An adhesive layer 442 (also referred to as adhesive film) can be used for securing the carrier 102 at the auxiliary carrier 440. Alternatively, the carrier 102 can be secured releasably at the auxiliary carrier 440 in some other suitable way.

In accordance with various embodiments, the spacer structure 430 is arranged between the carrier 102 and the auxiliary carrier 440, such that a gap 440*s* remains between the carrier 102 and the auxiliary carrier 440, defined by the spacer structure 430. Illustratively, it is thus possible to protect the infrared emitter layer 404*e* (or the infrared emitter structures 104) since the latter has no direct physical contact with the auxiliary carrier 440 and the adhesive layer 442.

As is illustrated in FIG. 4C in a schematic cross-sectional view, the carrier 102, on which the infrared emitter structures 104 are provided, can be thinned to a predefined thickness 102*d* (e.g. approximately 30 μm to approximately 300 μm, as described above), e.g. to a thickness of less than 250 μm. As an alternative thereto, larger thicknesses 102*d* for the carrier 102 are also possible.

Before thinning, the carrier 102 can have a thickness of 500 μm to 1 mm, like a conventional silicon wafer, for example.

As is illustrated in a schematic cross-sectional view in FIG. 4D, a cutout 106 can be formed in each of the component regions 111. This can be done by means of etching the carrier material, e.g. by means of a so-called Bosch etching process. The cutouts 106 proceeding from the thinned rear side 102*r* of the carrier 102 can extend in the direction of the infrared emitter structures 104. The etch stop layer 404*s* can define the depth 106*d* of the respective cutout 106.

During the etching process for forming the cutouts 106, additional alignment structures 450 can be etched into the rear side 102*r* of the carrier 102, provided that alignment structures 450 (so-called "alignment marks") are required.

In accordance with various embodiments, the alignment structures 450 can be formed in the supporting regions 102*s* of the carrier 102.

Furthermore, an infrared filter layer structure 108 can be preprocessed. To that end, an infrared filter layer 408*f* can be formed on and/or in a further carrier 408*t* (referred to as filter layer carrier). The infrared filter layer structure 108 may include a Bragg reflector layer, which can be formed on a filter layer carrier 408*t*, e.g. a glass substrate or a silicon substrate. In other words, the infrared filter layer 408*f* can be a Bragg reflector layer.

In accordance with various embodiments, the carrier 102 (i.e. illustratively the IR emitter carrier) and the infrared filter layer structure 108 (i.e. illustratively the IR filter carrier) can be aligned relative to one another, for example by means of an optical alignment device (a so-called alignment tool). Further alignment structures 452 can be formed in the infrared filter layer structure 108 (for aligning the infrared filter layer structure 108 and the carrier 102 relative to one another), provided that they are required.

If glass carriers, for example, are used as carrier 102, auxiliary carrier 440 and filter layer carrier 408*t*, the alignment of the glass carriers relative to one another can be carried out by means of optical methods, e.g. using wavelengths in the visible range of light. As an alternative thereto, e.g. if silicon wafers are used as carrier 102, auxiliary carrier 440 and/or filter layer carrier 408*t*, the alignment of the silicon wafers relative to one another can be carried out by means of infrared-optical methods using wavelengths in the infrared wavelength range. By way of example, a laser (e.g. an IR laser) can be used for aligning the carriers described herein relative to one another.

An adhesive or an adhesive layer 462 can be applied on the infrared filter layer structure 108 for the purpose of securing the infrared filter layer structure 108 at the carrier 102 (for example at the supporting regions 102*s* of the carrier 102). In this case, the adhesive layer 462 can be applied on the infrared filter layer 408*f*, wherein the filter layer carrier 408*t* faces away from the carrier 102.

In this case, the adhesive layer 462 can be formed on the entire surface 108*v* of the infrared filter layer structure 108 or in a structured fashion on only part of the surface 108*v* of the infrared filter layer structure 108. By way of example, the adhesive layer 462 can be applied only in those surface regions of the infrared filter layer structure 108 in which the carrier 102 adjoins the infrared filter layer structure 108 upon securing, that is to say that, for example, the adhesive layer 462 can be structured in a manner appropriately matching the supporting regions 102*s* of the carrier 102 (not illustrated).

Figure 4E:
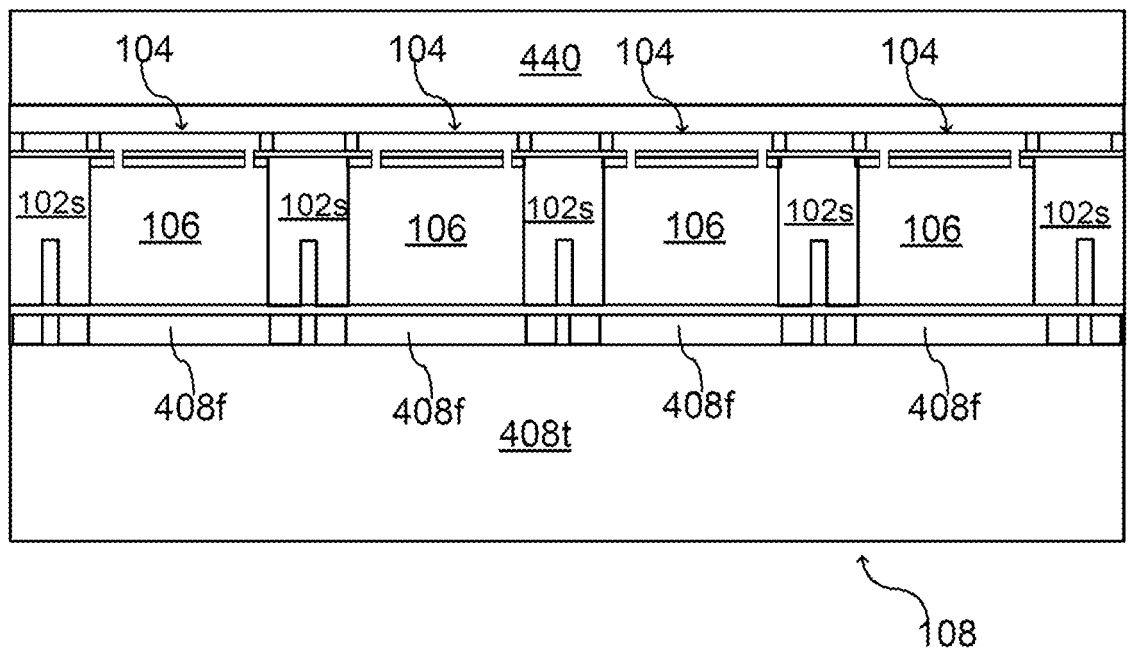

As is illustrated in FIG. 4E in a schematic cross-sectional view, the infrared filter layer structure 108 and the carrier 102 can be connected to one another. Illustratively, the filter layer carrier 408*t* can be secured at the stack including the carrier 102 and the auxiliary carrier 440 by means of the adhesive layer.

In accordance with various embodiments, various methods (for example by means of adhesive layers or, as an alternative thereto, by means of direct bonding methods) can be used to connect two or three of the carriers described herein to one another.

Figure 4F:
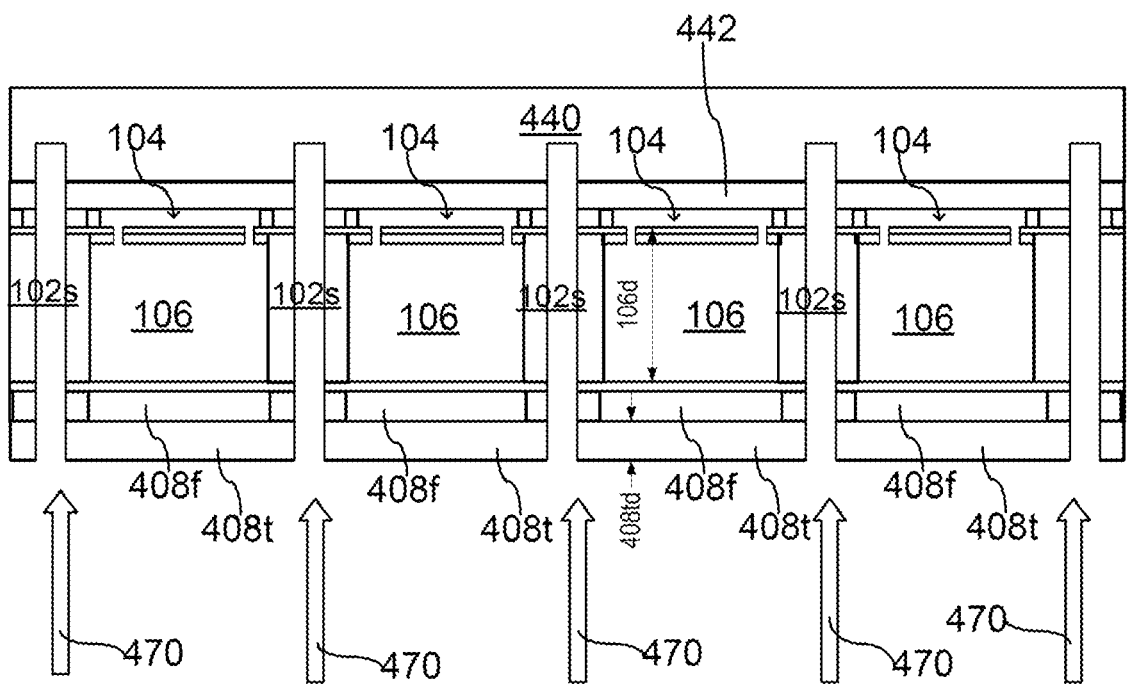

As is illustrated in FIG. 4F in a schematic cross-sectional view, the filter layer carrier 408*t* can be thinned to a predefined thickness 408*d*. The filter layer carrier 408*t* can be thinned for example to a thickness of less than 50 μm, e.g. to 30 μm. Illustratively, the filter layer carrier 408*t* must remain sufficiently mechanically stable.

The carrier stack (including the carrier 102, the auxiliary carrier 440 and the filter layer carrier 408*t*) can be mechanically sawn 470, for example, for the purpose of singulating the component regions or for the purpose of singulating a plurality of infrared emitter arrangements 100 from the carrier stack.

In this case, by way of example, it is possible to carry out sawing through the filter layer carrier 408*t* and the infrared filter layer 408*f*, through the supporting regions 102*s* of the carrier 102 or through the entire carrier 102. By way of example, it is possible to carry out sawing right into the auxiliary carrier 440.

In accordance with various embodiments, the region of the supporting regions 102*s* of the carrier 102 can be understood as sawing region 102*s* of a wafer 102 (a so-called kerf or sawing frame). In this regard, the respective component region 111 can also be understood as a chip region 111. Illustratively, a plurality of IR emitter/filter chips can thus be singulated from the carrier stack described herein. The term infrared emitter arrangement 100 can be used both for an individual infrared emitter chip and for the carrier stack. During singulation, regions of the infrared filter layer structure 108 (also referred to as infrared filter structures) are separated from one another.

Figure 4G:
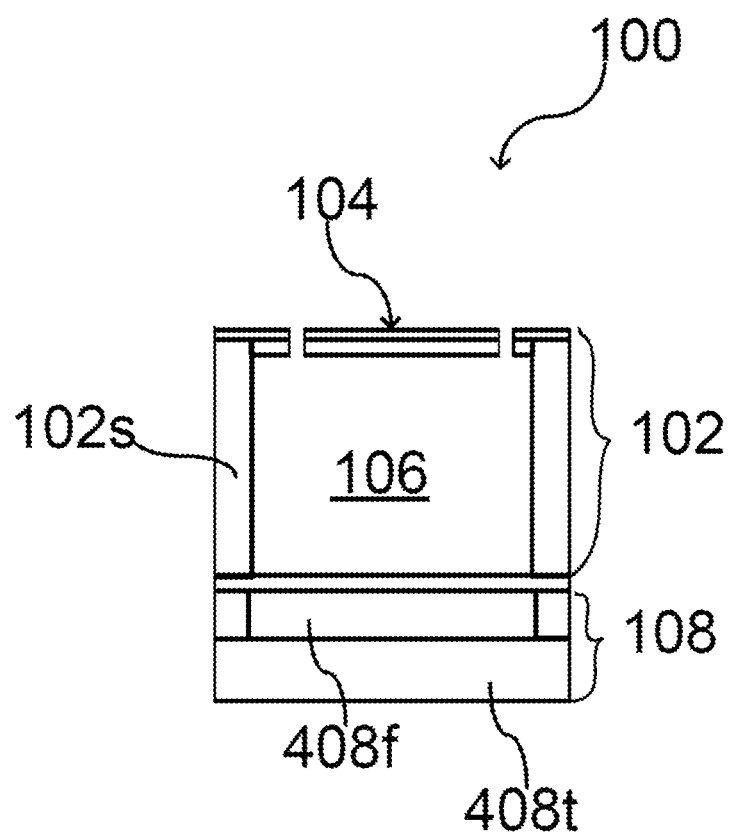
FIG. 4G shows a schematic cross-sectional view of a singulated infrared emitter arrangement, in accordance with various embodiments.

FIG. 4G illustrates an infrared emitter arrangement 100 after singulation and release from the auxiliary carrier 440 in a schematic cross-sectional view. In this case, the infrared emitter arrangement 100 includes a region of the carrier 102 and of the infrared filter layer structure 108. Functionally, each of the singulated infrared emitter arrangements 100 includes an infrared emitter structure 104, and an infrared filter structure (e.g. a section of the infrared filter layer structure 108).

A modified method is described below with reference to FIG. 5A to FIG. 5F, in which method the carrier stack is not subsequently sawn mechanically, rather the carrier 102 and the infrared filter layer structure 108 are prestructured in each case, by means of reactive ion etching (or so-called plasma dicing), such that the carrier stack can be separated into a plurality of infrared emitter arrangements in a simple manner.

In a manner similar to that in the case of the arrangement described with regard to FIG. 4C, the two preprocessed carriers can be aligned relative to one another, wherein before securing the two preprocessed carriers to one another, the latter can be prestructured for the later singulation, in accordance with various embodiments.

In accordance with various embodiments, a first separating structure 550 can be formed in the carrier 102. The first separating structure 550 can extend for example through the carrier 102, for example in the region of the supporting regions 102*s* of the carrier 102. By way of example, the first separating structure 550 can be formed by means of a first cutout structure, wherein the first cutout structure extends through the entire carrier 102. In accordance with various embodiments, the first cutout structure can also simultaneously be used as an alignment structure, analogously to the description given above.

In accordance with various embodiments, the infrared emitter structures 104 provided in and/or on the carrier 102 can be separated from one another by means of the first separating structure 550. Moreover, the cutouts 106 surrounded by the supporting regions 102*s* can be separated from one another by means of the first separating structure 550. Illustratively, the component regions of the carrier 102 are separated from one another by means of the first separating structure 550.

Figure 5A:
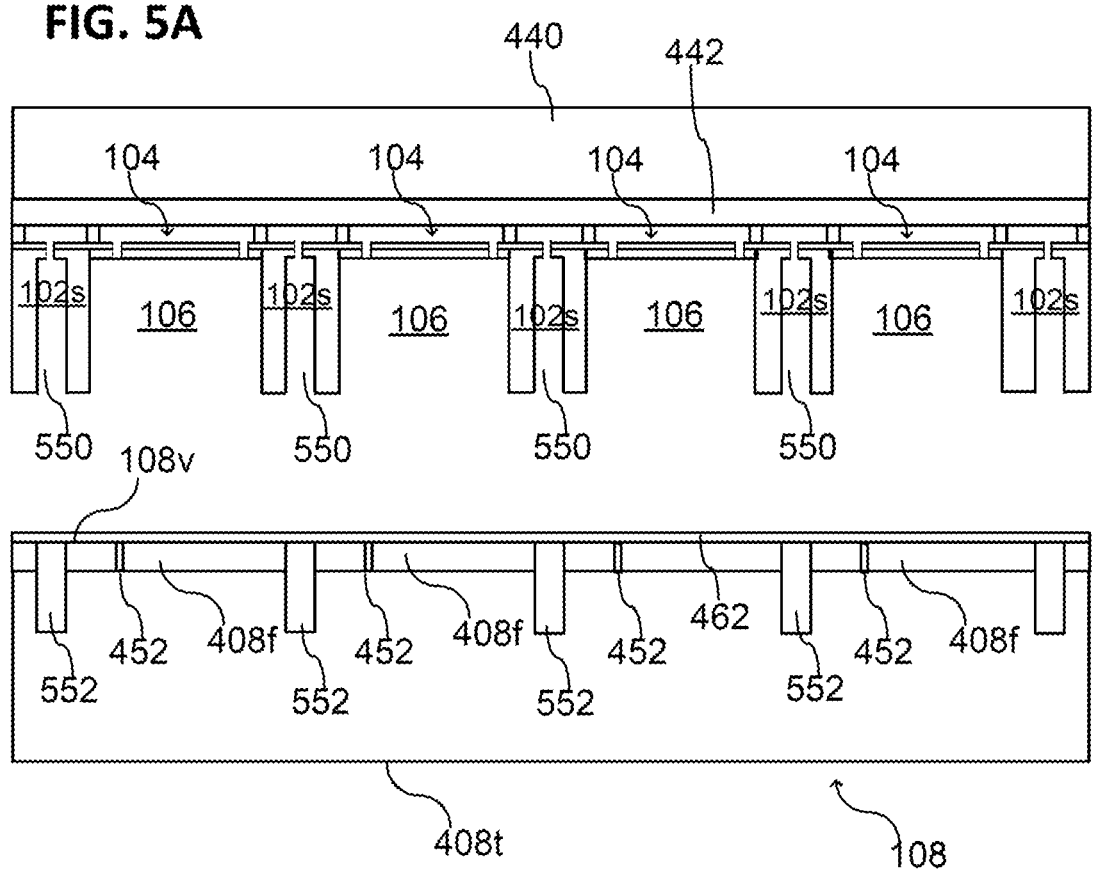

The carrier 102 illustrated in FIG. 5A is mechanically held together for example by the auxiliary carrier 460 and the adhesive layer 442, the component regions already having been singulated.

Furthermore, a second separating structure 552 can be formed in the infrared filter layer structure 108 (i.e. in the filter layer carrier 408*t* and in the infrared filter layer 408*f*). The second separating structure 552 can extend for example from the front side 108*v* of the infrared filter layer structure 108 into the latter. The second separating structure 552 can extend for example through the infrared filter layer 408*f* into the filter layer carrier 408*t* of the infrared filter layer structure 108. By way of example, the second separating structure 552 can be formed by means of a second cutout structure.

In accordance with various embodiments, the second cutout structure can also simultaneously be used as an alignment structure, analogously to the description given above. Optionally, other or further alignment structures 452 can be formed in the carrier 102 and/or in the infrared filter layer structure 108.

In accordance with various embodiments, the adhesive layer 462 arranged on the infrared filter layer structure 108 may not be prestructured, i.e. completely cover for example the front side 108*v* of the infrared filter layer structure 108. As an alternative thereto, the adhesive layer 462 may be structured in such a way that it covers the front side 108*v* of the infrared filter layer structure 108 only in the regions which are connected to the carrier 102 (not illustrated). Illustratively, the adhesive layer 462 can be formed on the infrared filter layer structure 108 in a manner appropriately matching the supporting regions 102*s* of the carrier 102.

In accordance with various embodiments, the first cutout structure can be implemented in the carrier 102 as a first separating structure 550 at the same time as the formation of the cutouts 106, for example by means of the same etching process (e.g. by means of a Bosch process).

In accordance with various embodiments, the second cutout structure as a second separating structure 552 can extend into the infrared filter layer structure 108 more deeply than the final thickness of the infrared filter layer structure 108, such that the latter can be simultaneously singulated for example by means of the thinning of the infrared filter layer structure 108 (also referred to as "dicing by grinding").

The second cutout structure as a second separating structure 552 can be formed for example by means of an etching process, for example by means of reactive plasma etching. As an alternative to a cutout structure, it is also possible to use other suitable structures as a respective separating structure 550, 552, e.g. a perforation structure, a predetermined braking structure or the like.

Figure 5B:
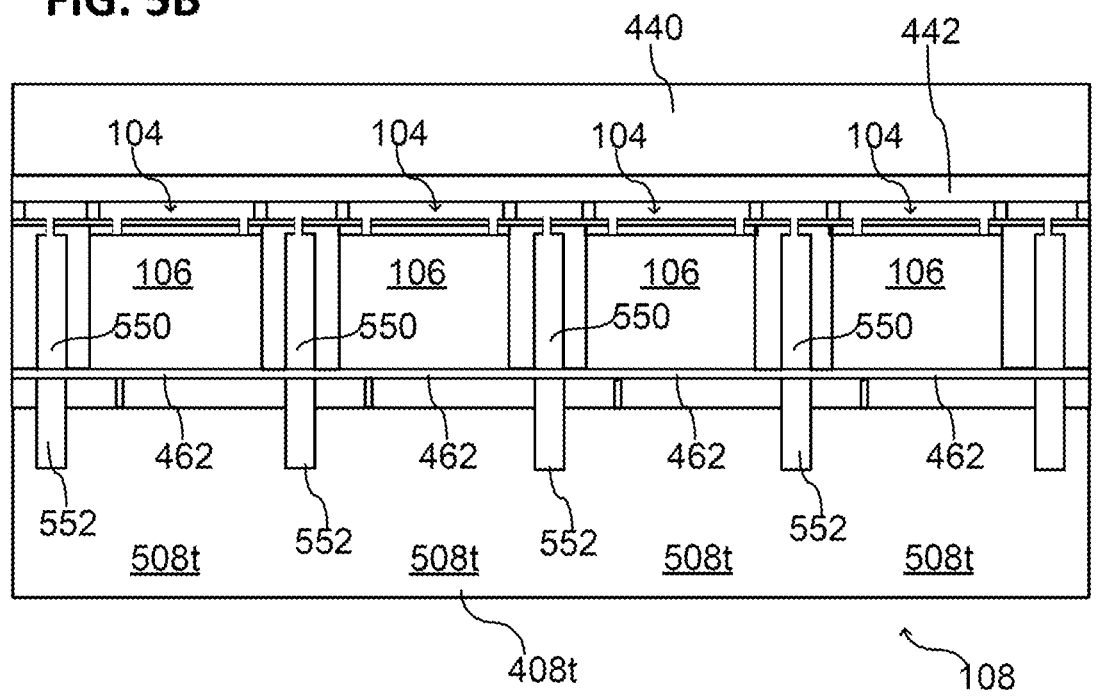

As is illustrated in FIG. 5B in a schematic cross-sectional view, the infrared filter layer structure 108 and the carrier 102 can be connected to one another, as described above. In this case, the carrier 102 and the infrared filter layer structure 108 can be arranged relative to one another in such a way that the first separating structure 550 and the second separating structure 552 are aligned in a manner appropriately matching one another (overlapping one another). The carrier stack illustrated in FIG. 5B is held together mechanically for example by the auxiliary carrier 460 and the non-structured region 508*t* (illustratively below the second separating structure 552) of the filter layer carrier 408*t* and also the adhesive layers 442, 462.

Figure 5C:
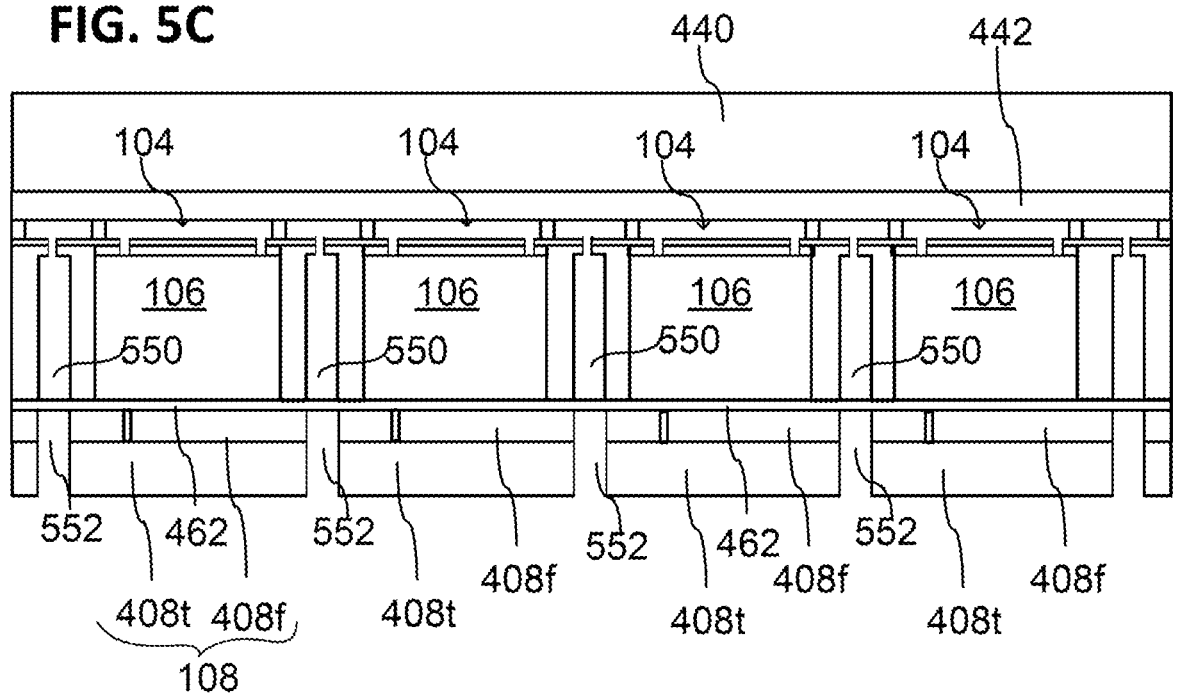

As is illustrated in FIG. 5C in a schematic cross-sectional view, the filter layer carrier 408*t* or the infrared filter layer structure 108 can be thinned to a predefined thickness 408*d*, as described above. During the thinning of the filter layer carrier 408*t* or of the infrared filter layer structure 108, regions of the infrared filter layer structure 108 (also referred to as infrared filter structures) are separated from one another on account of the separating structure 552 formed previously. The thinning can be carried out for example by means of polishing or grinding, i.e. mechanically.

Figure 5D:
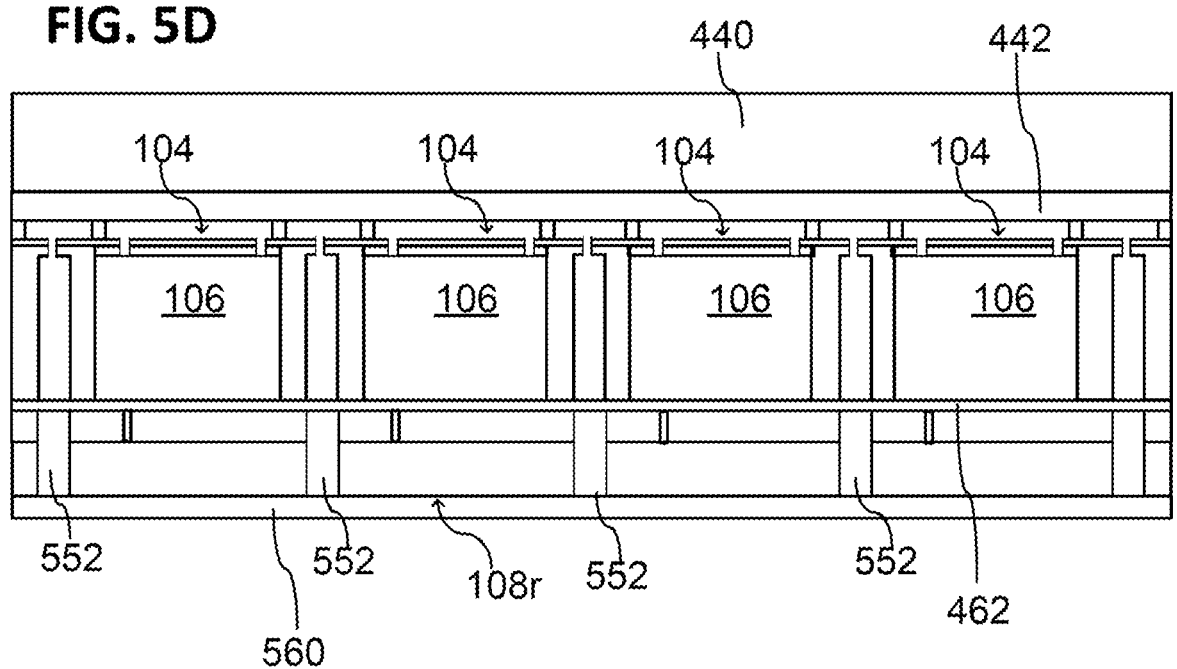

As is illustrated in FIG. 5D in a schematic cross-sectional view, after thinning the infrared filter layer structure 108, a sawing film 560 (or some other stabilization layer, e.g. a flexible layer, e.g. a polymer layer) can be applied on the exposed side 108*r* of the infrared filter layer structure 108.

Afterward, the auxiliary carrier 440 and the adhesive layer 442 can be removed, as is illustrated in FIG. 5E in a schematic cross-sectional view. Illustratively, the plurality of infrared emitter arrangements 100 formed are at this point held mechanically only by the sawing film 560 and the adhesive layer 462 on the infrared filter layer structure 108.

Afterward, the sawing film 560 can be expanded 590 and the infrared emitter arrangements 100 (i.e. the infrared emitter components) are in this case separated from one another, i.e. singulated. The infrared emitter arrangements 100 separated from one another can be transferred to some other structure, e.g. to a printed circuit board, into a chip package, etc., by means of a so-called pick and place process.

If the infrared emitter arrangements 100 separated from one another are intended to be taken up from the other side, a film rearrangement can be carried out, such that illustratively the sawing film is arranged on the front side of the carrier 102.

FIG. 5F illustrates a singulated infrared emitter arrangement 100 in a schematic cross-sectional view. The infrared emitter arrangement 100 may include for example the following: a carrier 102, an infrared emitter structure 104 arranged at a first side 102*v* of the carrier 102, a cutout 106 extending from a second side 102*r* of the carrier 102, said second side being situated opposite the first side 102*v*, in the direction of the infrared emitter structure 104; and an infrared filter layer structure 108 arranged at the second side 102*r* of the carrier 102 in such a way that the cutout 106 is arranged between the infrared emitter structure 104 and the infrared filter layer structure 108 for the purpose of separating (e.g. thermally insulating) the infrared emitter structure 104 from the infrared filter layer structure 108.

FIG. 6 illustrates a schematic flow diagram of a method 600 for producing an infrared emitter arrangement 100, in accordance with various embodiments. The method 600 may include, for example: in 610, providing a carrier 102, wherein the carrier 102 includes at least one infrared emitter structure 104 at a first side 102*v* of the carrier 102 and at least one cutout 106 at a second side 102*r* of the carrier 102, said second side being situated opposite the first side 120*v* of the carrier 102, wherein the at least one cutout 106 extends from the second side 102*r* of the carrier 102 in the direction of the at least one infrared emitter structure 104; and, in 620, securing an infrared filter layer structure 108 at the second side 102*r* of the carrier 102 in such a way that the at least one cutout 106 separates the at least one infrared emitter structure 104 from the infrared filter layer structure 108.

FIG. 7 illustrates a schematic view of a gas sensor 700, e.g. of a photoacoustic gas sensor, wherein the gas sensor 700 includes an infrared emitter arrangement 100 as described herein.

In this case, by means of the infrared emitter arrangement 100, infrared radiation 100 can be emitted in a measurement region 702. The emitted infrared radiation 110 can interact with a gas 704 in the measurement region; by way of example, the emitted infrared radiation 110 can be scattered elastically and/or inelastically. By way of example, an acoustic mode of a gas molecule can be excited in the gas 704.

The scattered infrared radiation 110 can be analyzed by means of a sensor 706, e.g. by means of a photodetector or the like.

Various embodiments are described below.

Example 1 is a method for producing an infrared emitter arrangement, the method including: providing a carrier, wherein the carrier includes at least one infrared emitter structure (e.g. a heating structure) at a first side of the carrier and at least one cutout at a second side of the carrier, said second side being situated opposite the first side of the carrier, wherein the at least one cutout extends from the second side of the carrier in the direction of the at least one infrared emitter structure; and securing an infrared filter layer structure at the second side of the carrier in such a way that the at least one cutout separates the at least one infrared emitter structure from the infrared filter layer structure. In this case, the infrared emitter structure can be formed on and/or in the carrier.

In example 2, the method in accordance with example 1 can optionally include the fact that providing the carrier includes forming the at least one cutout in the carrier. In other words, the method in accordance with example 1 can furthermore include the following: forming the at least one cutout in the carrier.

In example 3, the method in accordance with example 3 can optionally include the fact that forming the at least one cutout is carried out by means of an etching process.

In example 4, the method in accordance with example 2 or 3 can optionally include the fact that forming the at least one cutout includes thinning the carrier from the second side, preferably before forming the at least one cutout.

In example 5, the method in accordance with any of examples 1 to 4 can optionally include the fact that providing the carrier includes forming the at least one infrared emitter structure. In other words, the method in accordance with any of examples 1 to 4 can furthermore include the following: forming the at least one infrared emitter structure in the carrier.

In example 6, the method in accordance with any of examples 1 to 5 can optionally include the fact that the at least one infrared emitter structure includes an electrical resistance heating structure and also two contact regions that electrically contact the electrical resistance structure.

In example 7, the method in accordance with any of examples 1 to 6 can furthermore include: before securing the infrared filter layer structure (preferably before forming the at least one cutout in the carrier and preferably after forming the at least one infrared emitter structure), securing the carrier at an auxiliary carrier. In this case, the first side of the carrier can face the auxiliary carrier.

In example 8, the method in accordance with example 7 can optionally include the fact that a spacer structure is arranged between the carrier and the auxiliary carrier. The spacer structure can be arranged for example in such a way that a gap is provided between the carrier and the auxiliary carrier.

In example 9, the method in accordance with any of examples 1 to 8 can optionally include the fact that the infrared filter layer structure includes a filter layer carrier and furthermore an infrared filter layer formed on and/or in the filter layer carrier.

In example 10, the method in accordance with example 9 can optionally include the fact that the infrared filter layer structure is secured at the carrier in such a way that the infrared filter layer arranged on the filter layer carrier faces the carrier.

In example 11, the method in accordance with example 9 or 10 can optionally include the fact that the filter layer carrier is a semiconductor wafer or a plate-shaped glass carrier.

In example 12, the method in accordance with any of examples 9 to 11 can furthermore include: after securing the infrared filter layer structure at the carrier, thinning the filter layer carrier.

In example 13, the method in accordance with any of examples 9 to 12 can optionally include the fact that the filter layer carrier is configured to be optically transmissive for infrared radiation. In accordance with various embodiments, the transmissivity of the filter layer carrier, e.g. at a wavelength of greater than 800 nm, e.g. at 1.5 µm, can be more than 50%.

In example 14, the method in accordance with any of examples 9 to 13 can optionally include the fact that the infrared filter layer is configured as a Bragg filter layer. In this case, the infrared filter layer may include an alternately stacked layer sequence composed of at least two mutually different layers. In this case, one layer can be a silicon layer and another layer can be a silicon oxide layer.

In example 15, the method in accordance with any of examples 9 to 14 can optionally include the fact that the carrier defines a plurality of component regions, and that the at least one infrared emitter structure includes a plurality of infrared emitter structures, wherein in each case one of the infrared emitter structures is arranged in each of the component regions, and that the at least one cutout includes a plurality of cutouts, wherein in each case one of the cutouts is arranged in each of the component regions, wherein a supporting region of the carrier is arranged between in each case two adjacent cutouts. Illustratively, a plurality of identical structures (referred to herein as IR emitter chips or IR emitter components) can be formed alongside one another.

In example 16, the method in accordance with example 15 can furthermore include: after securing the infrared filter layer structure at the carrier, singulating the plurality of component regions. Illustratively, a plurality of IR emitter chips or IR emitter components can be singulated from a carrier assemblage. Analogously to the conventional singulation of chips of a wafer. In this case, e.g. after securing the infrared filter layer structure at the carrier, it is possible to form a separating structure extending through the infrared filter layer structure and the respective supporting regions of the carrier for the purpose of singulating the plurality of component regions.

In example 17, the method in accordance with example 16 can optionally include the fact that singulating the plurality of component regions includes mechanical sawing through the infrared filter layer structure and through the respective supporting regions of the carrier.

In example 18, the method in accordance with example 15 can furthermore include: e.g. before securing the infrared filter layer structure at the carrier, forming a first separating structure in the respective supporting regions of the carrier and forming a second separating structure in the infrared filter layer structure. In this case, in the course of securing the infrared filter layer structure at the carrier, the first and second separating structures are aligned relative to one another (illustratively one above the other or in an overlapping manner) for the purpose of singulating the plurality of component regions by means of the two separating structures.

In example 19, the method in accordance with example 18 can optionally include the fact that forming the first separating structure and the second separating structure is carried out by means of plasma etching.

In example 20, the method in accordance with any of examples 1 to 19 can optionally include the fact that the carrier and/or the infrared filter layer structure include/includes optical alignment structures for securing the infrared filter layer structure in a predefined relative positional arrangement at the carrier.

In example 21, the method in accordance with any of examples 1 to 20 can optionally include the fact that the carrier is a semiconductor wafer or a plate-shaped glass carrier.

In example 22, the method in accordance with any of examples 1 to 21 can optionally include the fact that the infrared filter layer structure is secured at the carrier by means of an adhesive layer.

In example 23, the method in accordance with any of examples 1 to 22 can optionally include the fact that the infrared filter layer structure is secured at the carrier by means of direct bonding. By means of direct bonding, for example, two silicon layers can be connected to one another, and also one silicon layer and one silicon oxide layer, and also two silicon oxide layers. In accordance with various embodiments, a glass carrier may include silicon oxide.

In example 24, the method in accordance with any of examples 1 to 23 can optionally include the fact that the infrared filter layer structure and/or the carrier include/includes at least one through hole for ventilating the at least one cutout.

Example 25 is an infrared emitter arrangement (for example an IR emitter chip or IR emitter component can be configured in an analogous manner), including: a carrier, an infrared emitter structure arranged at a first side of the carrier, a cutout extending from a second side of the carrier, said second side being situated opposite the first side, in the direction of the infrared emitter structure; and an infrared filter layer structure arranged at the second side of the carrier in such a way that the cutout is arranged between the infrared emitter structure and the infrared filter layer structure for the purpose of separating (e.g. thermally insulating) the infrared emitter structure from the infrared filter layer structure.

In example 26, the infrared emitter arrangement in accordance with example 25 can furthermore include: an adhesive layer, arranged between the infrared filter layer structure and the carrier, for securing the infrared filter layer structure at the carrier.

In example 27, the infrared emitter arrangement in accordance with example 25 or 26 can optionally include the fact that the infrared emitter structure includes an electrical resistance layer and a barrier layer (e.g. an oxide layer as an etch stop layer), wherein the cutout exposes the barrier layer.

In example 28, the infrared emitter arrangement in accordance with any of examples 25 to 27 can optionally include the fact that the carrier is a semiconductor wafer or a plate-shaped glass carrier.

In example 29, the infrared emitter arrangement in accordance with any of examples 25 to 28 can optionally include the fact that the carrier has a thickness in a range of 50 µm to 250 µm. Illustratively, the carrier can be thinned in the method to a thickness in a range of 50 µm to 250 µm.

In example 30, the infrared emitter arrangement in accordance with any of examples 25 to 29 can optionally include the fact that the infrared emitter structure has a thickness in a range of 1 µm to 30 µm.

In example 31, the infrared emitter arrangement in accordance with any of examples 25 to 30 can optionally include the fact that the infrared filter layer structure includes a filter layer carrier and an infrared filter layer formed on and/or in the filter layer carrier.

In example 32, the infrared emitter arrangement in accordance with example 31 can optionally include the fact that the infrared filter layer formed on the filter layer carrier faces the carrier.

In example 33, the infrared emitter arrangement in accordance with example 31 or 32 can optionally include the fact that the filter layer carrier is a semiconductor wafer or a plate-shaped glass carrier.

In example 34, the infrared emitter arrangement in accordance with any of examples 31 to 33 can optionally include the fact that the filter layer carrier is configured to be optically transmissive for infrared radiation.

In example 35, the infrared emitter arrangement in accordance with any of examples 31 to 34 can optionally include the fact that the infrared filter layer is configured as a Bragg filter layer.

In example 36, the infrared emitter arrangement in accordance with any of examples 25 to 35 can optionally include the fact that the infrared filter layer structure has a thickness in a range of 5 µm to 50 µm. Illustratively, the infrared filter layer structure can be thinned in the method to a thickness in a range of 5 µm to 50 µm. As an alternative thereto, the infrared emitter arrangement in accordance with any of examples 31 to 35 can optionally include the fact that the filter layer carrier of the infrared filter layer structure has a thickness in a range of 5 nm to 50 µm. Illustratively, the filter layer carrier can be thinned in the method to a thickness in a range of 5 µm to 50 µm.

In example 37, the infrared emitter arrangement in accordance with any of examples 25 to 36 can optionally include the fact that the infrared filter layer structure is secured at the carrier by means of direct bonding. In this case, the filter layer carrier of the infrared filter layer structure can face away from the carrier and the infrared filter layer of the infrared filter layer structure can face the carrier.

In example 38, the infrared emitter arrangement in accordance with any of examples 25 to 37 can optionally include the fact that the infrared filter layer structure and/or the carrier include/includes at least one through hole for ventilating the cutout.

Example 39 is a photoacoustic gas sensor, including: an infrared emitter arrangement in accordance with any of examples 25 to 38 for emitting infrared radiation into a measurement region; and a sensor for detecting infrared radiation emitted from the measurement region.

Various embodiments are based, for example, on providing an infrared emitter (also referred to as infrared emitter structure or infrared emitter chip) and an infrared filter (also referred to as infrared filter structure or infrared filter chip) in a single chip or chip package having a small structural size, in conjunction with low production costs. Illustratively, an infrared emitter arrangement (also referred to as IR emitter/filter system or infrared emitter/filter component) is described herein which can be integrated into chips conventionally used. In accordance with various embodiments, an IR emitter and an IR filter can be integrated in just one chip package.

In accordance with various embodiments, a complete infrared emitter/filter component is provided which has a small structural size and can be produced with low costs. In accordance with various embodiments, a wafer level production method for producing the infrared emitter/filter component is described, wherein at least one wafer-to-wafer bonding process can be used.

In accordance with various embodiments, an IR emitter wafer is secured (e.g. adhesively bonded, bonded, etc.) at an IR filter wafer. To that end, it is also possible to use a carrier wafer (also referred to as auxiliary carrier), at which the IR emitter wafer is secured. In this case, by way of example, the IR emitter wafer and the IR filter wafer are secured to one another at the wafer level (i.e. before the process of singulating the IR emitter/filter systems). The IR emitter wafer and the IR filter wafer can be thinned for example to a predefined thickness, e.g. by means of grinding. Afterward, a plurality of infrared emitter/filter components that were formed by means of the wafer stack can be singulated by means of sawing the wafer stack. As an alternative thereto, before the wafers are actually secured to one another, the individual wafers can be prestructured in such a way that they can be divided later in a simple manner.

In accordance with various embodiments, a method for producing an infrared emitter arrangement (e.g. one infrared emitter/filter component or a plurality of infrared emitter/filter components) may include the following: providing a carrier, wherein the carrier includes at least one infrared emitter structure (e.g. at least one heating structure) at a first side of the carrier and at least one cutout at a second side of the carrier, said second side being situated opposite the first side of the carrier, wherein the at least one cutout extends from the second side of the carrier in the direction of the at least one infrared emitter structure; and securing an infrared filter layer structure at the second side of the carrier in such a way that the at least one cutout separates (e.g. thermally insulates) the at least one infrared emitter structure from the infrared filter layer structure.

In accordance with various embodiments, an infrared emitter arrangement (e.g. an infrared emitter/filter component) may include the following: a carrier, an infrared emitter structure arranged at a first side of the carrier, a cutout extending from a second side of the carrier, said second side being situated opposite the first side, in the direction of the infrared emitter structure; and an infrared filter layer structure arranged at the second side of the carrier in such a way that the cutout is arranged between the infrared emitter structure and the infrared filter layer structure for the purpose of separating (e.g. for thermally insulating) the infrared emitter structure from the infrared filter layer structure.

In accordance with various embodiments, the infrared filter layer structure can be or include a multilayer structure. By way of example, a layer stack can be formed, which includes a plurality of first layers and a plurality of second layers. Said plurality of first and second layers can be stacked alternately. In this case, the first layers can have a first refractive index and the second layers can have a second refractive index, wherein the first refractive index is different than the second refractive index. In accordance with various embodiments, silicon layers and silicon oxide layers can be stacked alternately, e.g. more than two layers of each type. Alternatively, other suitable layer structures and/or layer stacks can be used as an infrared filter.

In accordance with various embodiments, a method for producing an infrared emitter arrangement may include the following: providing (e.g. forming) a carrier including at least one infrared emitter structure at a first side of the carrier, and furthermore including a cutout, wherein the cutout extends from a second side of the carrier, said second side being situated opposite the first side of the carrier, in the direction of the infrared emitter structure; and securing an infrared filter layer structure on the second side of the carrier, wherein the at least one cutout separates (e.g. spatially separates and thermally separates) the infrared emitter structure from the infrared filter layer structure.

In accordance with various embodiments, a method for producing an infrared emitter arrangement may include the following: forming at least one cutout in a carrier, wherein the carrier includes a component layer having at least one infrared emitter structure on a first side of the carrier, and wherein the at least one cutout extends from a second side of the carrier, said second side being situated opposite the first side, in the direction of the at least one infrared emitter structure; and securing an infrared filter layer structure on the second side of the carrier, such that the at least one cutout is arranged between the component layer and the infrared filter layer structure, wherein the at least one cutout separates the infrared emitter structure from the infrared filter layer structure.

In accordance with various embodiments, a method for producing an infrared emitter arrangement may include the following: forming at least one cutout in a carrier, wherein the carrier includes a component layer having at least one infrared emitter structure on a first side of the carrier, and wherein the at least one cutout extends from a second side of the carrier, said second side being situated opposite the first side, in the direction of the at least one infrared emitter structure; and securing an infrared filter layer structure on the second side of the carrier, such that the at least one cutout is arranged between the at least one infrared emitter structure and the infrared filter layer structure.

In accordance with various embodiments, the cutout can be free of solid or liquid material. The cutout can for example be filled with air or have an opening for pressure equalization with the surroundings.

In accordance with various embodiments, a method for producing an infrared emitter arrangement may include the following: securing an infrared filter layer structure on a rear side of a carrier, wherein the carrier includes a component layer on a front side, wherein the component layer includes at least one infrared emitter structure; and forming at least one cutout in the carrier between the component layer and the infrared filter layer structure, wherein the at least one cutout separates the infrared emitter structure from the infrared filter layer structure.

In accordance with various embodiments, a method for producing an infrared emitter arrangement may include the following: securing an infrared filter layer structure on a rear side of a carrier, wherein the carrier includes a component layer on a front side, wherein the component layer includes at least one infrared emitter structure for emitting thermal radiation; and forming at least one cutout in the carrier between the at least one infrared emitter structure and the infrared filter layer structure.

In accordance with various embodiments, the infrared emitter structure can be or include a heating structure.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for producing an infrared emitter arrangement, the method comprising:
   providing a carrier, wherein the carrier comprises at least one infrared emitter structure at a first side of the carrier and at least one cutout at a second side of the carrier, said second side being situated opposite the first side of the carrier, wherein the at least one cutout extends from the second side of the carrier in the direction of the at least one infrared emitter structure; and
   securing an infrared filter layer structure at the second side of the carrier in such a way that the at least one cutout separates the at least one infrared emitter structure from the infrared filter layer structure; wherein the infrared filter layer structure comprises a filter layer carrier and an infrared filter layer formed at least one of on or in the filter layer carrier, wherein the infrared filter layer is disposed between a region of the filter layer carrier and the carrier;
   wherein the filter layer carrier is optically transmissive for infrared radiation.

2. The method of claim 1, further comprising:
   forming the at least one cutout in the carrier by an etching process.

3. The method of claim 1, further comprising:
   thinning the carrier from the second side.

4. The method of claim 1, further comprising:
   before securing the infrared filter layer structure, securing the carrier at an auxiliary carrier, wherein the first side of the carrier faces the auxiliary carrier.

5. The method of claim 4,
   wherein a spacer structure is arranged between the carrier and the auxiliary carrier in such a way that a gap is provided between the carrier and the auxiliary carrier.

6. The method of claim 1,
   wherein the infrared filter layer structure comprises a filter layer carrier and an infrared filter layer, wherein the infrared filter layer is formed at least one of on or in the filter layer carrier.

7. The method of claim 6,
   wherein the infrared filter layer structure is secured at the carrier in such a way that the infrared filter layer faces the carrier.

8. The method of claim 6,
   wherein the carrier is a semiconductor wafer or a plate-shaped glass carrier.

9. The method of claim 6,
   wherein the filter layer carrier is a semiconductor wafer or a plate-shaped glass carrier.

10. The method of claim 6, further comprising:
    after securing the infrared filter layer structure at the carrier, thinning the filter layer carrier.

11. The method of claim 6,
    wherein the infrared filter layer is configured as a Bragg filter layer.

12. The method of claim 1,
    wherein the carrier defines a plurality of component regions, and
    wherein the at least one infrared emitter structure comprises a plurality of infrared emitter structures,
    wherein in each case one of the infrared emitter structures is arranged in each of the component regions, and wherein the at least one cutout comprises a plurality of cutouts, wherein in each case one of the plurality of cutouts is arranged in each of the component regions, wherein the infrared filter layer structure comprises a plurality of infrared filter structures, wherein in each case one of the plurality of infrared filter structures is arranged in each of the component regions, and wherein a supporting region of the carrier is arranged between in each case two adjacent cutouts.

13. The method of claim 12, further comprising:
after securing the infrared filter layer structure at the carrier, singulating the plurality of component regions by mechanical sawing through the infrared filter layer structure and through the carrier.

14. The method of claim 12, further comprising:
before securing the infrared filter layer structure at the carrier, forming a first separating structure in the respective supporting regions of the carrier and forming a second separating structure in the infrared filter layer structure, wherein, in the course of securing the infrared filter layer structure at the carrier, the first and second separating structures are aligned relative to one another for the purpose of singulating the plurality of component regions by the two separating structures.

15. The method of claim 14, further comprising:
wherein forming the first separating structure and the second separating structure is carried out by plasma etching.

16. An infrared emitter arrangement, comprising:
a carrier,
an infrared emitter structure arranged at a first side of the carrier,
a cutout extending from a second side of the carrier, said second side being situated opposite the first side, in the direction of the infrared emitter structure; and
an infrared filter layer structure arranged at the second side of the carrier in such a way that the cutout is arranged between the infrared emitter structure and the infrared filter layer structure for the purpose of separating the infrared emitter structure from the infrared filter layer structure, wherein the infrared filter layer structure comprises a filter layer carrier and an infrared filter layer formed at least one of on or in the filter layer carrier, wherein the infrared filter layer is disposed between a region of the filter layer carrier and the carrier;

wherein the filter layer carrier is optically transmissive for infrared radiation.

17. The infrared emitter arrangement of claim 16,
wherein the carrier is disposed between the infrared filter layer and the infrared emitter structure.

18. The infrared emitter arrangement of claim 16,
wherein the infrared filter layer is configured as a Bragg filter layer.

19. The infrared emitter arrangement of claim 16,
wherein at least one of the infrared filter layer structure or the carrier comprises at least one through hole for ventilating the cutout.

20. The infrared emitter arrangement of claim 16,
wherein the infrared emitter structure comprises an electrical resistance heating structure.

21. The infrared emitter arrangement of claim 16,
wherein the filter layer carrier comprises glass.

22. The infrared emitter arrangement of claim 16,
wherein the filter layer carrier comprises a thickness of less than 50 µm.

23. The infrared emitter arrangement of claim 16,
wherein the infrared filter layer structure has a thickness in a range of 5 µm to 50 µm.

24. A gas sensor, comprising:
an infrared emitter arrangement for emitting infrared radiation into a measurement region; and
a sensor for detecting infrared radiation, emitted from the measurement region;
the infrared emitter arrangement comprising:
a carrier,
an infrared emitter structure arranged at a first side of the carrier,
a cutout extending from a second side of the carrier, said second side being situated opposite the first side, in the direction of the infrared emitter structure; and
an infrared filter layer structure arranged at the second side of the carrier in such a way that the cutout is arranged between the infrared emitter structure and the infrared filter layer structure for the purpose of separating the infrared emitter structure from the infrared filter layer structure, wherein the infrared filter layer structure comprises a filter layer carrier and an infrared filter layer formed at least one of on or in the filter layer carrier, wherein the infrared filter layer is disposed between a region of the filter layer carrier and the carrier;
wherein the filter layer carrier is optically transmissive for infrared radiation.

* * * * *